US008922459B2

(12) United States Patent
Kondo et al.

(10) Patent No.: US 8,922,459 B2
(45) Date of Patent: Dec. 30, 2014

(54) VIDEO PROJECTING APPARATUS AND METHOD OF CONTROLLING VIDEO PROJECTING APPARATUS

(75) Inventors: Yoshitake Kondo, Kanagawa (JP); Naoya Matsuda, Tokyo (JP); Tomoya Masuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 196 days.

(21) Appl. No.: 13/593,658

(22) Filed: Aug. 24, 2012

(65) Prior Publication Data
US 2013/0057601 A1  Mar. 7, 2013

(30) Foreign Application Priority Data

Sep. 1, 2011  (JP) ................................ 2011-190432

(51) Int. Cl.
*G09G 3/00* (2006.01)
*H04N 9/31* (2006.01)
*G03B 21/14* (2006.01)

(52) U.S. Cl.
CPC ............ *H04N 9/3188* (2013.01); *G03B 21/142* (2013.01)
USPC ........................................... 345/32; 348/744

(58) Field of Classification Search
CPC ....... G03B 5/02; G03B 21/142; H04N 9/3188
USPC ...................... 345/32, 698; 348/744, 747, 451
See application file for complete search history.

(56) References Cited

U.S. PATENT DOCUMENTS

2011/0157487 A1* 6/2011 Akeyama
2012/0236270 A1* 9/2012 Maruyama

FOREIGN PATENT DOCUMENTS

JP   6-95063    4/1994
JP   8-154221   6/1996

* cited by examiner

*Primary Examiner* — Regina Liang
(74) *Attorney, Agent, or Firm* — Frommer Lawrence & Haug LLP; William S. Frommer

(57) ABSTRACT

Provided is a video projecting apparatus including a video processing unit that processes a video signal input from outside, a display device that is driven based on the video signal processed by the video processing unit, a lens that projects a video formed by the display device to the outside, a lens driving unit that drives the lens, and a control unit that controls the video processing unit to enlarge a video source input from the outside in accordance with an aspect ratio of the video source through resolution conversion, reserves adjustment values of positions of the lens in accordance with aspect ratios of video sources, and controls the lens driving unit by calling an adjustment value corresponding to an aspect ratio of a video source input from the outside among the adjustment values.

4 Claims, 2 Drawing Sheets

VIDEO PROJECTING APPARATUS AND METHOD OF CONTROLLING VIDEO PROJECTING APPARATUS

BACKGROUND

The present disclosure relates to a video projecting apparatus and a method of controlling the video projecting apparatus, and more particularly, to a video projecting apparatus capable of displaying a video source using a display device with an aspect ratio horizontally longer than 16:9 without using an anamorphic lens and a method of controlling the video projecting apparatus.

Video projecting apparatuses that drive a liquid crystal display (LCD) panel as a display device based on a video signal input from the outside and project a video formed by the LCD panel to an outside screen through a lens have come into use at home or the like. In video projecting apparatuses according to the related art, the following methods <a> and <b> have been utilized when a video source of CINEMASCOPE (registered trademark) of the aspect ratio of 2.35:1 is displayed:

<a> a video processing unit of a video projecting apparatus changes an aspect ratio to match the aspect ratio of an LCD panel by expanding an input video source with the aspect ratio of 2.35:1 in a vertical direction; and <b> an aspect ratio is converted into the aspect ratio of 2.35:1 again by expanding a video formed by an LCD panel using a commercially available anamorphic lens in a horizontal direction, and then the video is fitted and projected to a screen with the aspect ratio of 2.35:1.

In the fields of video projecting apparatuses according to the related art, technologies for improving light utilization efficiency using an anamorphic lens and projecting a video have been suggested (for example, Japanese Unexamined Patent Application Publication No. 6-95063).

SUMMARY

However, since an anamorphic lens is expensive, some users may not be able to use the anamorphic lens. When an anamorphic lens is not able to be used, the following methods <c> and <d> have been used instead of the above-mentioned methods <a> and <b> to display a video source with an aspect ratio of 2.35:1:

<c> a video processing unit of a video projecting apparatus outputs a video source with an aspect ratio of 23.5:1 so that the aspect ratio of an original video portion remains at 2.35:1 (when an aspect ratio of an LCD panel is 16:9, a video source to which horizontal black bands are added to upper and lower portions of the video portion to match the aspect ratio of 16:9 is output as a letter box); and <d> a user manually adjusts the values of zoom, focus, and shift (movement of a video to upper, lower, right, and left sides of a position to which the video is projected) of a lens of the video projecting apparatus.

Through this adjustment process, the original video portion other than the black bands in the video formed by the LCD panel is fitted and projected to a screen with an aspect ratio of 2.35:1.

However, adjusting the position of a lens manually is troublesome to a user. Further, there are video sources of movies with aspect ratios other than the aspect ratio of 2.35:1 (for example, VistaVision in which an aspect ratio is 1.85:1). Therefore, whenever video sources of movies with different aspect ratios are displayed, the user has to adjust the position of such a lens.

There are video projecting apparatuses that use an LCD panel with an aspect ratio of 17:9 in conformity with the digital cinema initiative (DCI) standard of digital cinema. A video processing unit of such a video projecting apparatus adds not only horizontal black bands to the upper and lower portions of a video source with the aspect ratio of 2.35:1 but also vertical black bands to the right and left portions of the video source (that is, a frame image is set) in the above-mentioned method <c>.

However, when an LCD panel is driven based on many video signals corresponding to black signals, for which the black bands are added to not only the upper and lower portions of the video source but also the right and left portions of the video source, an amount of light output from the LCD panel may decrease. Therefore, the luminance of a video projected to a screen may decrease.

It is desirable to provide a video projecting apparatus suitable for displaying a video source of a movie using a display device with an aspect ratio horizontally longer than 16:9 without using an anamorphic lens and a method of controlling the video projecting apparatus.

According to an embodiment of the present disclosure, there is provided a video projecting apparatus including: a video processing unit that processes a video signal input from outside; a display device that is driven based on the video signal processed by the video processing unit; a lens that projects a video formed by the display device to the outside; a lens driving unit that drives the lens; and a control unit.

The control unit controls the video processing unit to enlarge a video source input from the outside in accordance with an aspect ratio of the video source through resolution conversion, reserves adjustment values of positions of the lens in accordance with aspect ratios of video sources, and controls the lens driving unit by calling an adjustment value corresponding to an aspect ratio of a video source input from the outside among the adjustment values.

According to another embodiment of the present disclosure, there is provided a method of controlling a video projecting apparatus including a video processing unit that processes a video signal input from outside, a display device that is driven based on the video signal processed by the video processing unit, a lens that projects a video formed by the display device to the outside, a lens driving unit that drives the lens, and a control unit.

The method includes reserving, by the control unit, adjustment values of positions of the lens in accordance with aspect ratios of video sources; controlling, by the control unit, the video processing unit to enlarge a video source in accordance with an aspect ratio of the video source input from the outside through resolution conversion; and controlling, by the control unit, the lens driving unit by calling an adjustment value corresponding to an aspect ratio of a video source input from the outside among the adjustment values.

According to the embodiments of the present disclosure, the video processing unit is controlled to enlarge the video source in accordance with the aspect ratio of the video source input from the outside through the resolution conversion.

Accordingly, for example, when a video source of a movie is displayed using a display device with an aspect ratio horizontally longer than 16:9, a black signal corresponding to black bands added to upper, lower, right, and left sides of the video source can be decreased through the resolution conversion. As a result, the display device can be driven based on a video signal for which the black signal is less. Accordingly, when the video source of a movie is displayed using the display device with an aspect ratio horizontally longer than 16:9, the luminance of a video projected to a screen can be improved.

According to the embodiments of the present disclosure, the adjustment values of the lens corresponding to the aspect ratios of the video sources are reserved and the lens driving unit is controlled by calling the adjustment value corresponding to the aspect ratio of the video source input from the outside among the adjustment values.

Accordingly, for example, when the video source of a movie is displayed, the adjustment value is reserved so that the video source is fitted and projected to a screen with the aspect ratio in accordance with the aspect ratio of the video source of the movie. Thereafter, the reserved adjustment value is called and the lens driving unit can be controlled. Accordingly, the video source of the movie can be fitted and projected to the screen, even when an expensive anamorphic lens is not used and a user does not manually adjust the position of the lens for each of the video sources with different aspect ratios.

DETAILED DESCRIPTION OF THE EMBODIMENTS

Figure 1:
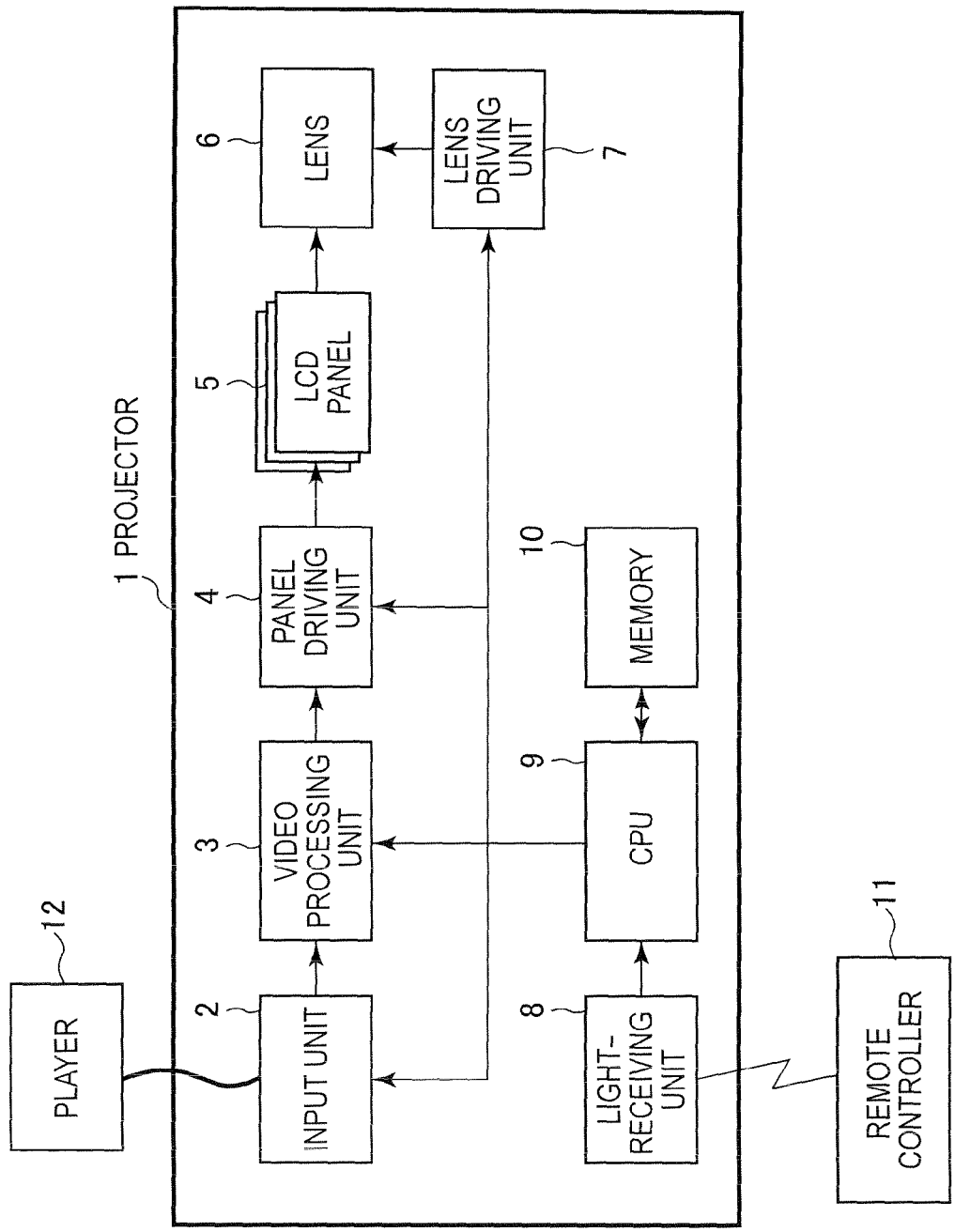
FIG. 1 is a block diagram illustrating the configuration of main units of a video projecting apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an embodiment of the present disclosure will be described with reference to the appended drawings.

FIG. 1 is a diagram illustrating the configuration of main units of a video projecting apparatus (hereinafter referred to as a projector) according to the embodiment of the present technology. In this embodiment, video signals of a high definition television (HDTV) method are input from a player 12 to a projector 1. The player 12 plays a Blu-ray (registered trademark) disc or a digital versatile disc (DVD).

An input unit 2 determines the resolution, a frame rate, or a scanning method (for example, 1080.60i or 1080.60p) of each video signal input to the projector 1. Then, the video signals are transmitted to a panel driving unit 4 through a video processing unit 3 that processes various video signals. The panel driving unit 4 drives three LCD panels 5 serving as display devices based on R, G, and B video signals. An aspect ratio of each LCD panel 5 is assumed to be 17:9 in conformity with the DCI standard of digital cinema.

Red light, green light, and blue light are irradiated to the three LCD panels 5 by a light source in the projector 1 and an illumination optical system (neither of which is shown). The three LCD panels 5 form red, green, and blue videos in accordance with driving voltages from the panel driving unit 4.

The red, green, and blue videos formed by the LCD panels 5 are synthesized by a color synthesizing element (not shown), and then the synthesized video is projected to the outside by a lens 6. The lens 6 is driven by a lens driving unit 7 so that the values of zoom, focus, and shift (movement of a projection position in upper, lower, right, and left sides) can be adjusted.

A light-receiving unit 8 receives an infrared signal indicating operation contents of a remote controller 11 pertaining to the projector 1. A central processing unit (CPU) 9 is a control unit that controls the entire projector 1 based on the operation contents of the remote controller 11, a determination result of the input unit 2, or the like.

The remote controller 11 includes operation buttons used to perform the following operations as operation buttons according to an embodiment of the present disclosure:

a first operation of adjusting the positions (values of zoom, focus, and shift) of the lens 6;

a second operation of reserving the adjustment values of the positions of the lens 6 obtained through the first operation in correspondence with the aspect ratios of video sources input in the adjustment operation; and a third operation of displaying a menu of the reservation results of the adjustment values of the positions of the lens 6 obtained through the second operation and selecting a reservation result for any aspect ratio (for example, an aspect ratio of a video source which a user inputs from the outside and displays) among the adjustment values.

Based on the result of the second operation, the CPU 9 reserves the adjustment values of the positions of the lens 6 obtained through the first operation in correspondence with the aspect ratios of the video sources of movies in a non-volatile memory 10.

Accordingly, when the user adjusts the positions of the lens 6 once so that the video source with the aspect ratio of the video source of each movie is fitted and projected to a screen with this aspect ratio, the user can reserve the adjustment value in the memory 10.

The CPU 9 projects and displays the reservation results of the memory 10 as a menu image on an outside screen based on the result of the third operation and controls the video processing unit 3 and the lens driving unit 7 in accordance with a selection result on the menu image. The CPU 9 controls the video processing unit 3 by performing an "input signal enlarging process" of enlarging a video source in accordance with an aspect ratio of the video source input from the outside through the resolution conversion. The CPU 9 also performs "lens position calling control" of calling the adjustment value corresponding to the aspect ratio of a video source input from the outside among the adjustment values of the positions of the lens 6 reserved in the memory 10 from the memory 10 and controlling the lens driving unit 7 based on the called adjustment value.

Figure 2A:
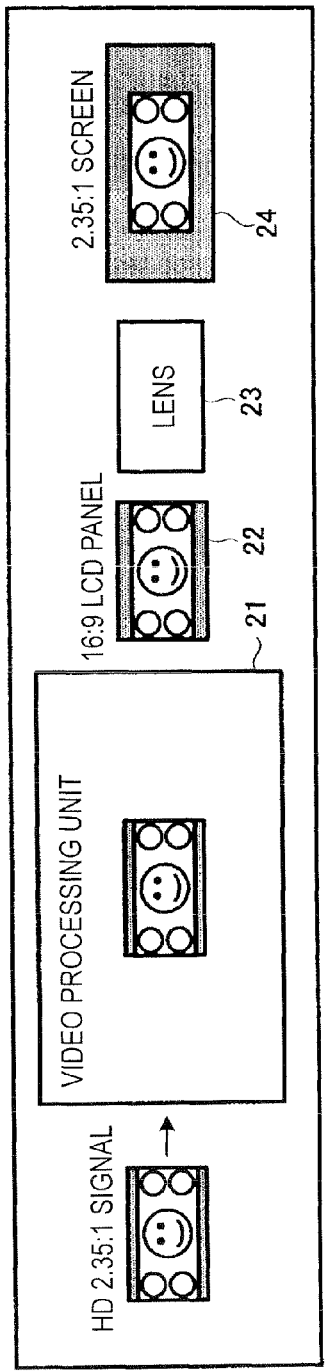
FIGS. 2A and 2B are diagrams illustrating cases in which a video source with an aspect ratio of 2.35:1 is displayed by the video projecting apparatus according to the embodiment of the present disclosure.
Figure 2B:
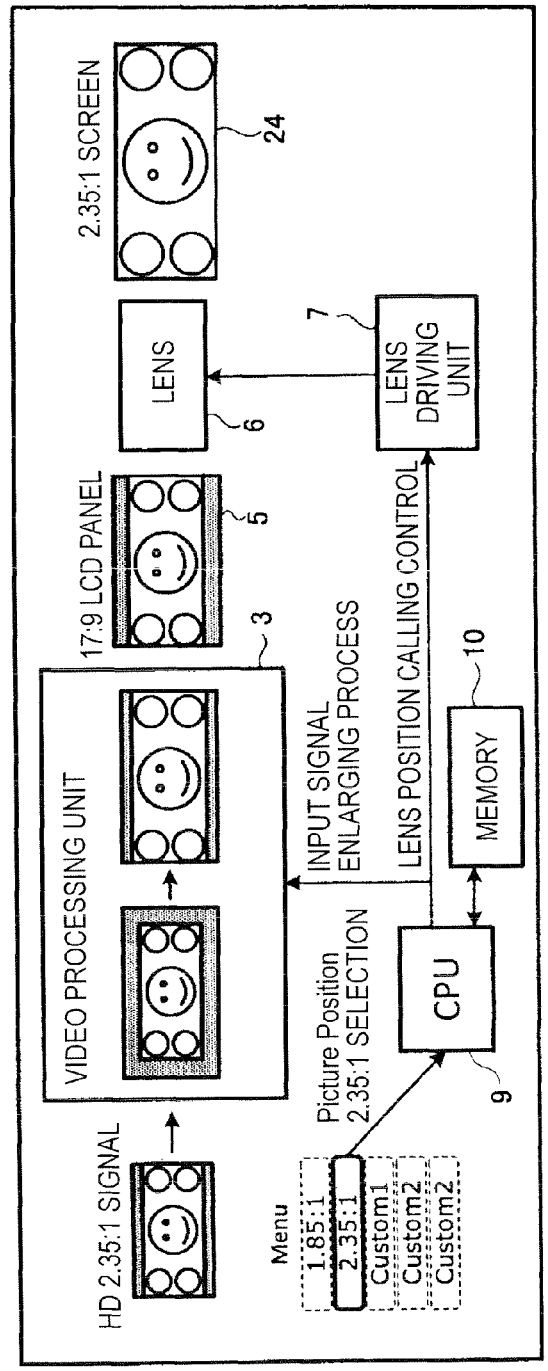

FIGS. 2A and 2B show the "input signal enlarging process" and the "lens position calling control" when a video source of CINEMASCOPE (registered trademark) with an aspect ratio of 2.35:1 in conformity with the HDTV method is input into and displayed by the projector 1 shown in FIG. 1. FIG. 2A shows a control example when the video source with an aspect ratio of 2.35:1 is displayed by a projector (in which an aspect ratio of an LCD panel is 16:9) according to the related art without using an anamorphic lens. To compare the control example of FIG. 2A, FIG. 2B shows a control example when the video source with an aspect ratio of 2.35:1 is displayed by the projector 1.

In the projector according to the related art, as shown in FIG. 2A, a video processing unit 21 outputs the input video source with an aspect ratio of 2.35:1 so that the aspect ratio of an original video portion remains at 2.35:1. Therefore, a video output by the projector according to the related art is output as a letter box in which horizontal black bands are added to the upper and lower sides to match an aspect ratio of 16:9 of an LCD panel 22. Accordingly, when the values of zoom, focus, and shift of the lens 23 are not adjusted, the video projected from the lens 23 to a screen 24 with an aspect ratio of 2.35:1 may include a black frame.

In this state, however, since the original video portion may decrease in the video projected to the screen 24 and the black frame is displayed around the original video portion, contrast may deteriorate due to black floating. The user has to manually adjust the values of the zoom, shift, and focus of the lens 23 when the original video portion other than the black bands is fitted and projected to the screen 24 in order to resolve this disadvantage. Further, there are video sources of movies with aspect ratios other than an aspect ratio of 2.35:1. Therefore, the user has to adjust the position of the lens 23 whenever video sources of movies with different aspect ratios are displayed.

In the projector 1 shown in FIG. 1, however, a menu image shown in the lower left corner of FIG. 2B is displayed on the screen 24 through the above-mentioned third operation of the remote controller 11. The menu image is configured such that the user can select any one of five picture positions "1.85:1," "2.35:1," "Custom 1," "Custom 2," and "Custom 3."

The picture position "1.85:1" is a picture position corresponding to the reservation result (the reservation results of the above-described first and second operations) of the adjustment value of the position of the lens 6 with respect to the video source with an aspect ratio of 1.85:1. The picture position "2.35:1" is a picture position corresponding to the reservation result of the adjustment value of the position of the lens 6 with respect to the video source with an aspect ratio of 2.35:1.

The picture positions "Custom 1" to "Custom 3" are aspect ratios other than 1.85:1 and 2.35:1 and picture positions corresponding to the reservation results of the adjustment values with respect to the video source of movies input when the user adjusts the position of the lens 6. As the video source with an aspect ratio other than 1.85:1 and 2.35:1, there is a video source in which the aspect ratio of the original video portion is 2.35:1 and subtitles are added below the original video portion. In the case of the video source in which subtitles are added, it is necessary to shift the lens 6 upward compared to a general aspect ratio of 2.35:1 to display the subtitles. Therefore, the adjustment value of the position of the lens 6 is different from that of the case of a general aspect ratio of 2.35:1.

As shown in FIG. 2B, when "2.35:1" is selected on the menu image, the CPU 9 controls the video processing unit 3 such that the video processing unit 3 performs the "input signal enlarging process" in <1> below and also performs the "lens position calling control" on the lens driving unit 7 in <2> below:

<1> vertical black bands are added to not only the upper and lower sides of a video source with an aspect ratio of 2.35:1 but also the right and left sides of the video source to match an aspect ratio of 17:9 of the LCD panel 5 so that the aspect ratio of the original video portion remains at 2.35:1 (that is, a frame image is set). On the left of the block of the video processing unit 3 in FIG. 2B, the process of adding the vertical black bands is shown.

Next, the black signals corresponding to the vertical black bands are eliminated and the black signals corresponding to the horizontal black bands are also eliminated by enlarging the video source set as the frame image horizontally and vertically at the same magnification through the resolution conversion. On the right of the block of the video processing unit 3 in FIG. 2B, the process of enlarging the video source is shown. Further, in the case of the LCD panel 5 with an aspect ratio of 17:9, the magnification at which the black signals corresponding to the vertical black bands are accurately eliminated is 16/15 times.

<2> The adjustment value corresponding to an aspect ratio of 2.35:1 is called among the adjustment values of the positions of the lens 6 reserved in the memory 10 from the memory 10, and the lens driving unit 7 is controlled based on the called adjustment value.

The video processing unit 3 can drive the LCD panel 5 based on the video signal for which the black signal is less by performing the "input signal enlarging process" described in <1> above. Thus, when the video source with an aspect ratio of 2.35:1 is displayed using the LCD panel 5 with an aspect ratio of 17:9, the luminance of a video projected to the screen 24 can be improved.

Further, the video source with an aspect ratio of 2.35:1 is fitted and projected to the screen 24 with an aspect ratio of 2.35:1 by performing the "lens position calling control" described in <2> above on the lens 6. Thus, the video source with an aspect ratio of 2.35:1 can be fitted and projected to the screen 24 even when an expensive anamorphic lens is not used and a user does not manually adjust the position of the lens 6 for each of the video sources with different aspect ratios.

Furthermore, the "input signal enlarging process" of the video processing unit 3 is interlocked with the "lens position calling control" on the lens driving unit 7 only when the user performs a single operation of selecting a picture position on a menu image. Accordingly, since it is not necessary to separately perform the operation of enlarging the video source by the video processing unit 3 and the operation of calling the adjustment value of the position of the lens 6, the operation work is reduced.

The case in which "2.35:1" is selected on the menu image in FIG. 2B has been described. However, even when a picture position other than "2.35:1" is selected on the menu image, the image processing unit 3 and the lens driving unit 7 are controlled in the same manner. Accordingly, when a screen with an aspect ratio corresponding to the selection result is provided, the luminance of a video projected to the screen can be improved and the video source can be fitted and projected to the screen.

In the above-described embodiment of the present disclosure, there is provided the projector 1 that uses the LCD panel 5 with an aspect ratio of 17:9 in conformity with the DCI standard of a digital cinema. However, according to another embodiment of the present disclosure, there may be provided a projector that uses an LCD panel (for example, an LCD panel conforming to a standard of an aspect ratio of 18:9 when the aspect ratio of 18:9 is used) with an aspect ratio other than the aspect ratio of 17:9 and horizontally longer than 16:9. Further, according to yet another embodiment of the present disclosure, there may be provided a projector that uses an LCD panel with an aspect ratio of 16:9 according to the related art. Therefore, even when another LCD panel with an aspect ratio different from the aspect ratio of 16:9 is used, a desired video can be projected to a screen by appropriately adjusting the position of a lens.

In the above-described embodiment, five picture positions (that is, the reservation results of the adjustment values of the positions of the lens 6 with respect to the video sources of five aspect ratios), "1.85:1," "2.35:1," "Custom 1," "Custom 2," and "Custom 3" can be selected. However, according to still another embodiment, the reservation results of the adjustment values of the positions of the lens 6 with respect to the video sources with two, three, four, or six or more aspect ratios may be configured to be selected.

It should be understood by those skilled in the art that various modifications, combinations, sub-combinations and alterations may occur depending on design requirements and other factors insofar as they are within the scope of the appended claims or the equivalents thereof.

Additionally, the present disclosure may also be configured as below.

(1) A video projecting apparatus including:
a video processing unit that processes a video signal input from outside;
a display device that is driven based on the video signal processed by the video processing unit;
a lens that projects a video formed by the display device to the outside;
a lens driving unit that drives the lens; and
a control unit that controls the video processing unit to enlarge a video source input from the outside in accordance with an aspect ratio of the video source through resolution conversion, reserves adjustment values of positions of the lens in accordance with aspect ratios of video sources, and controls the lens driving unit by calling an adjustment value corresponding to an aspect ratio of a video source input from the outside among the adjustment values.

(2) The video projecting apparatus according to (1),
wherein the display device is a liquid crystal display panel with an aspect ratio horizontally longer than 16:9, and
the control unit controls the video processing unit such that a black signal corresponding to black bands decreases by adding the black bands to upper, lower, right, and left sides of a video source of a movie input from the outside in accordance with an aspect ratio of the video source of the movie and then enlarging the video source through the resolution conversion (3) The video projecting apparatus according to (1) or (2), wherein the control unit reserves adjustment values of zoom, focus, and shift of the lens as the adjustment values of the positions of the lens.

(4) The video projecting apparatus according to any of (1) to (3), further including:
an operation unit that performs a first operation of adjusting the positions of the lens, a second operation of reserving adjustment values obtained through the first operation in correspondence with aspect ratios of video sources of a movie, and a third operation of selecting a reservation result for any aspect ratio among the reservation results obtained through the second operation,
wherein the control unit reserves the adjustment value of the position of the lens based on the result obtained through the second operation of the operation unit and controls the video processing unit and the lens driving unit based on the result obtained through the third operation of the operation unit.

(5) A method of controlling a video projecting apparatus including a video processing unit that processes a video signal input from outside, a display device that is driven based on the video signal processed by the video processing unit, a lens that projects a video formed by the display device to the outside, a lens driving unit that drives the lens, and a control unit, the method including:
reserving, by the control unit, adjustment values of positions of the lens in accordance with aspect ratios of video sources;
controlling, by the control unit, the video processing unit to enlarge a video source in accordance with an aspect ratio of the video source input from the outside through resolution conversion; and
controlling, by the control unit, the lens driving unit by calling an adjustment value corresponding to an aspect ratio of a video source input from the outside among the adjustment values.

The present disclosure contains subject matter related to that disclosed in Japanese Priority Patent Application JP 2011-190432 filed in the Japan Patent Office on Sep. 1, 2011, the entire content of which is hereby incorporated by reference.

What is claimed is:

1. A video projecting apparatus comprising:
a video processing unit that processes a video signal input from outside;
a liquid crystal display panel that is driven based on the video signal processed by the video processing unit, the liquid crystal display panel having an aspect ratio horizontally longer than 16:9;
a lens that projects a video formed by the display device to the outside;
a lens driving unit that drives the lens; and
a control unit that controls the video processing unit to enlarge a video source input from the outside in accordance with an aspect ratio of the video source through resolution conversion, reserves adjustment values of positions of the lens in accordance with aspect ratios of video sources, and controls the lens driving unit by calling an adjustment value corresponding to an aspect ratio of a video source input from the outside among the adjustment values, such that a black signal corresponding to black bands decreases by adding the black bands to upper, lower, right, and left sides of a video source of a movie input from the outside in accordance with an aspect ratio of the video source of the movie and then enlarging the video source through the resolution conversion.

2. The video projecting apparatus according to claim 1, wherein the control unit reserves adjustment values of zoom, focus, and shift of the lens as the adjustment values of the positions of the lens.

3. The video projecting apparatus according to claim 2, further comprising:
an operation unit that performs a first operation of adjusting the positions of the lens, a second operation of reserving adjustment values obtained through the first operation in correspondence with aspect ratios of video sources of a movie, and a third operation of selecting a reservation result for any aspect ratio among the reservation results obtained through the second operation,
wherein the control unit reserves the adjustment value of the position of the lens based on the result obtained through the second operation of the operation unit and controls the video processing unit and the lens driving unit based on the result obtained through the third operation of the operation unit.

4. A method of controlling a video projecting apparatus including a video processing unit that processes a video signal input from outside, a display device that is driven based on the video signal processed by the video processing unit, a lens that projects a video formed by the display device to the outside, a lens driving unit that drives the lens, and a control unit, the method comprising:

reserving, by the control unit, adjustment values of positions of the lens in accordance with aspect ratios of video sources;

controlling, by the control unit, the video processing unit to enlarge a video source in accordance with an aspect ratio of the video source input from the outside through resolution conversion; and controlling, by the control unit, the lens driving unit by calling an adjustment value corresponding to an aspect ratio of a video source input from the outside among the adjustment values, such that a black signal corresponding to black bands decreases by adding the black bands to upper, lower, right, and left sides of a video source of a movie input from the outside in accordance with an aspect ratio of the video source of the movie and then enlarging the video source through the resolution conversion.

* * * * *